(12) United States Patent
Bardy et al.

(10) Patent No.: US 12,509,806 B2
(45) Date of Patent: Dec. 30, 2025

(54) BRAIDING MACHINE WITH A RESERVE ZONE

(71) Applicant: ARIANEGROUP SAS, Les Mureaux (FR)

(72) Inventors: Julien Bardy, Le Haillan (FR);
Cassandre Vince, Le Haillan (FR);
Kevin Tymczuk, Le Haillan (FR);
Aline Bollengier, Le Haillan (FR);
Amélie Marduel, Le Haillan (FR)

(73) Assignee: ARIANEGROUP SAS, Les Mureaux (FR)

( * ) Notice: Subject to any disclaimer, the term of this patent is extended or adjusted under 35 U.S.C. 154(b) by 0 days.

(21) Appl. No.: 18/880,757

(22) PCT Filed: Jun. 28, 2023

(86) PCT No.: PCT/FR2023/050990
§ 371 (c)(1),
(2) Date: Jan. 2, 2025

(87) PCT Pub. No.: WO2024/009023
PCT Pub. Date: Jan. 11, 2024

(65) Prior Publication Data
US 2025/0171937 A1 May 29, 2025

(30) Foreign Application Priority Data

Jul. 5, 2022 (FR) ........................................ 2206813
Jul. 5, 2022 (FR) ........................................ 2206815

(51) Int. Cl.
*D04C 3/30* (2006.01)
*D04C 3/18* (2006.01)
(Continued)

(52) U.S. Cl.
CPC ................. *D04C 3/30* (2013.01); *D04C 3/18* (2013.01); *D04C 3/24* (2013.01); *D04C 3/48* (2013.01)

(58) Field of Classification Search
CPC ... D04C 3/10; D04C 3/18; D04C 3/24; D04C 3/26; D04C 3/28; D04C 3/30; D04C 3/48
See application file for complete search history.

(56) References Cited

U.S. PATENT DOCUMENTS

| | | | |
|---|---|---|---|
| 933,341 A * | 9/1909 | Rahm | D04C 1/06 87/37 |
| 2,354,212 A | 7/1944 | Jeckel | |

(Continued)

FOREIGN PATENT DOCUMENTS

| | | |
|---|---|---|
| DE | 625 521 C | 2/1936 |
| EP | 3 502 332 A1 | 6/2019 |

(Continued)

OTHER PUBLICATIONS

International Search Report as issued in International Patent Application No. PCT/FR2023/050990, dated Nov. 9, 2023.

(Continued)

*Primary Examiner* — Shaun R Hurley
(74) *Attorney, Agent, or Firm* — Pillsbury Winthrop Shaw Pittman LLP

(57) ABSTRACT

A braiding machine includes a plurality of yarn feed spindles movable along a guide path so as to participate in the braiding, a reserve zone able to receive at least one spindle such that its participation in the braiding is interrupted.

9 Claims, 9 Drawing Sheets

(51) Int. Cl.
*D04C 3/24* (2006.01)
*D04C 3/48* (2006.01)

(56) References Cited

U.S. PATENT DOCUMENTS

| | | | | |
|---|---|---|---|---|
| 2,388,693 A * | 11/1945 | Jeckel | ............ | D04C 3/44 |
| | | | | 87/9 |
| 2,494,389 A * | 1/1950 | Jeckel | ............ | D04C 3/14 |
| | | | | 87/9 |
| 2,788,700 A * | 4/1957 | Crossley | ............ | D04C 3/20 |
| | | | | 87/50 |
| 2,879,687 A * | 3/1959 | Leimbach | ............ | D04C 3/06 |
| | | | | 87/37 |
| 3,866,512 A * | 2/1975 | Berger | ............ | D04C 3/30 |
| | | | | 87/8 |
| 5,067,384 A * | 11/1991 | Scala | ............ | D04C 1/06 |
| | | | | 87/6 |
| 5,385,077 A * | 1/1995 | Akiyama | ............ | D04C 1/06 |
| | | | | 87/8 |
| 5,396,829 A * | 3/1995 | Akiyama | ............ | B29C 70/16 |
| | | | | 87/29 |
| 7,833,218 B2 * | 11/2010 | Lunn | ............ | B29C 70/222 |
| | | | | 604/526 |
| 8,347,772 B2 | 1/2013 | Dow et al. | | |
| 9,416,489 B2 * | 8/2016 | Erlendsson | ............ | D07B 5/00 |
| 9,845,571 B2 * | 12/2017 | Kirth | ............ | D04C 3/12 |
| 10,060,056 B1 * | 8/2018 | Head | ............ | D04C 1/00 |
| 11,155,947 B2 * | 10/2021 | Kiefer | ............ | D04C 3/18 |
| 11,447,900 B2 * | 9/2022 | Allen | ............ | D04C 1/12 |
| 11,447,901 B2 * | 9/2022 | Allen | ............ | D04C 3/32 |
| 11,566,355 B1 * | 1/2023 | Chen | ............ | D04C 3/30 |
| 2004/0094024 A1 * | 5/2004 | Kim | ............ | D04C 3/06 |
| | | | | 87/9 |
| 2013/0167710 A1 * | 7/2013 | Dow | ............ | D04C 1/06 |
| | | | | 87/9 |
| 2015/0045831 A1 * | 2/2015 | Allen | ............ | A61B 17/04 |
| | | | | 87/8 |
| 2016/0183942 A1 * | 6/2016 | Allen | ............ | D04C 3/40 |
| | | | | 606/228 |
| 2021/0071331 A1 | 3/2021 | Head et al. | | |

FOREIGN PATENT DOCUMENTS

| | | |
|---|---|---|
| FR | 2 804 133 A1 | 7/2001 |
| JP | H07-11550 A | 1/1995 |
| JP | H07-18548 A | 1/1995 |
| JP | H07-15791 U | 3/1995 |
| WO | WO 2015/117148 A1 | 8/2015 |

OTHER PUBLICATIONS

Written Opinion of the International Searching Authority as issued in International Patent Application No. PCT/FR2023/050990, dated Nov. 9, 2023.

* cited by examiner

[Fig. 1]
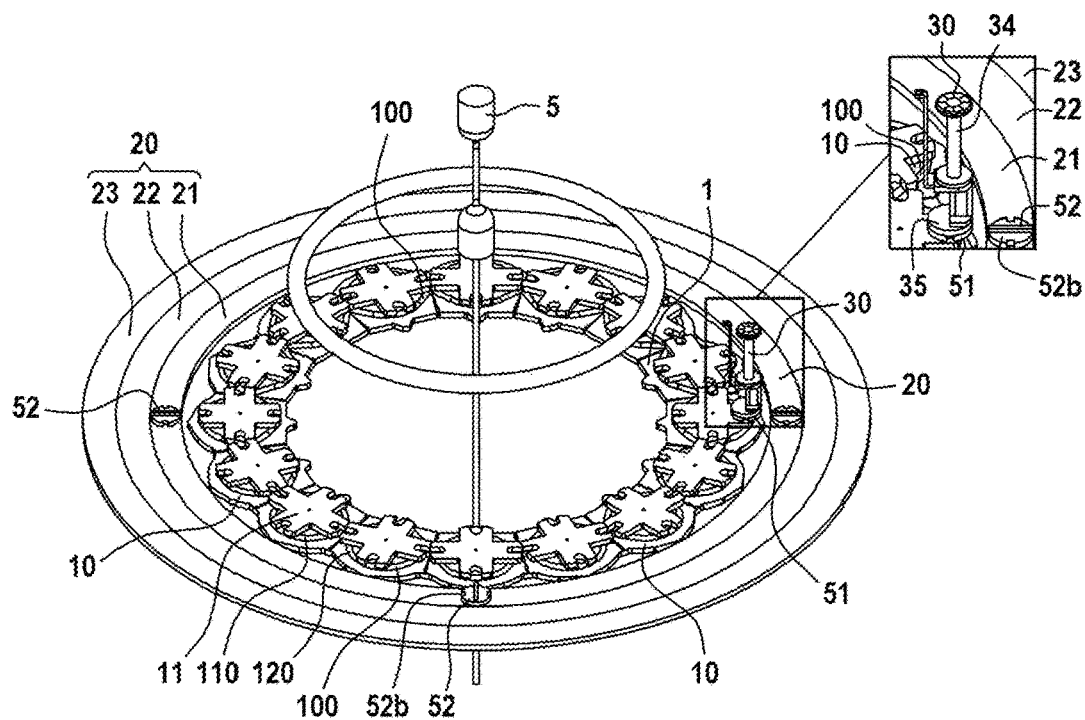
[Fig. 2]
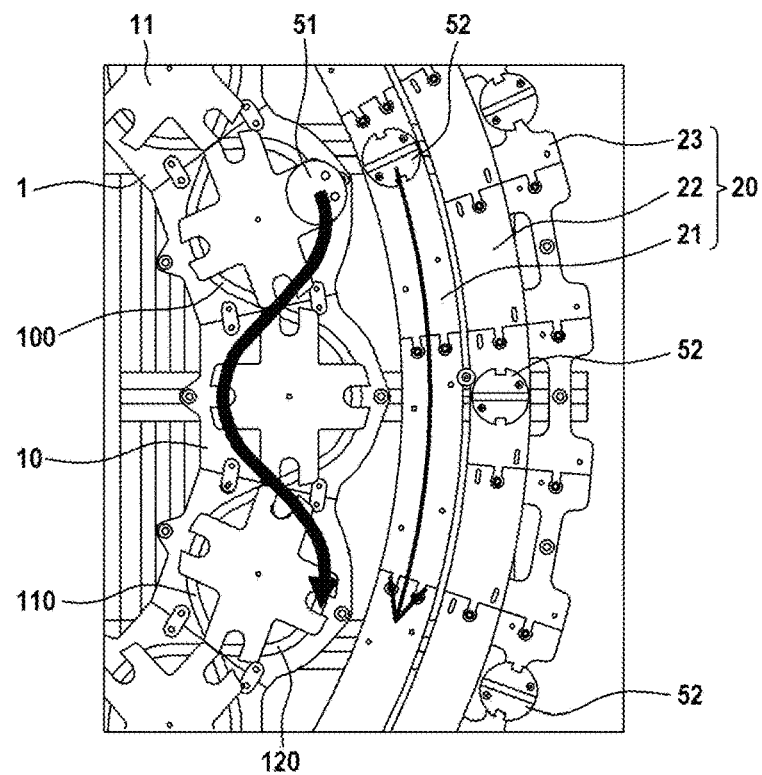

[Fig. 3]
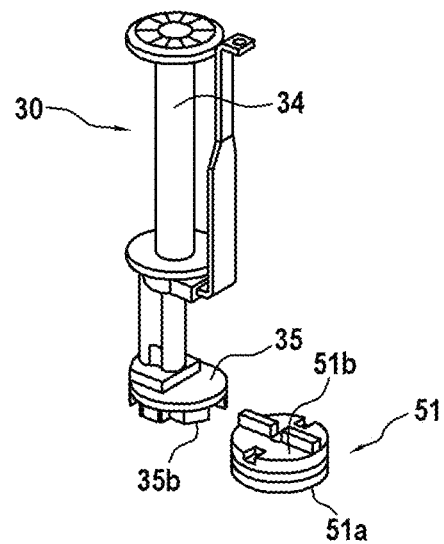
[Fig. 4]
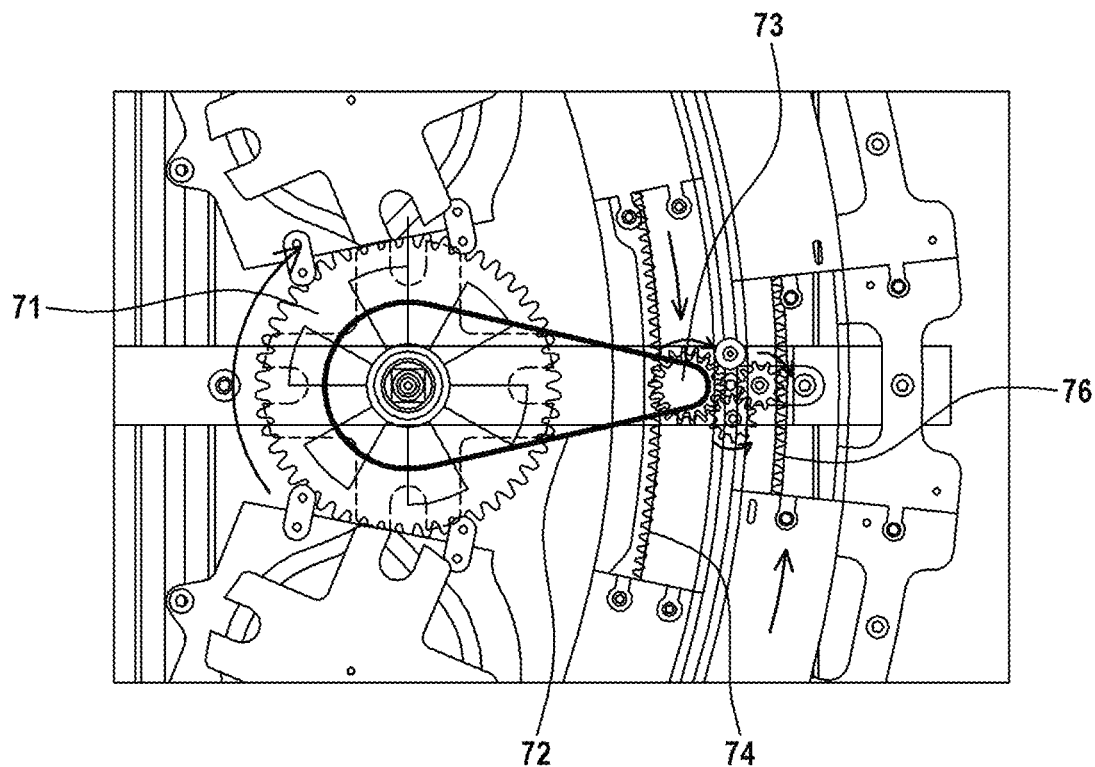

[Fig. 5]
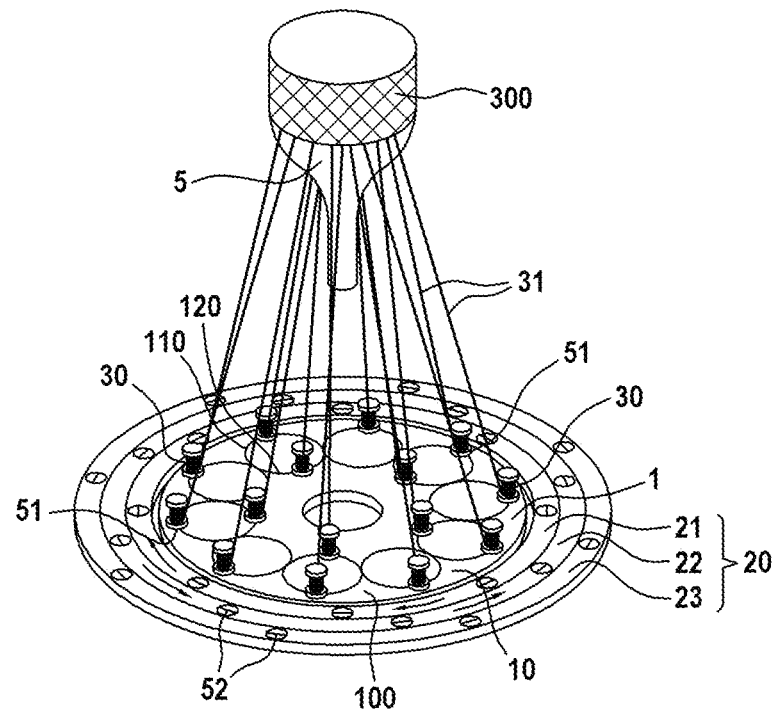
[Fig. 6]
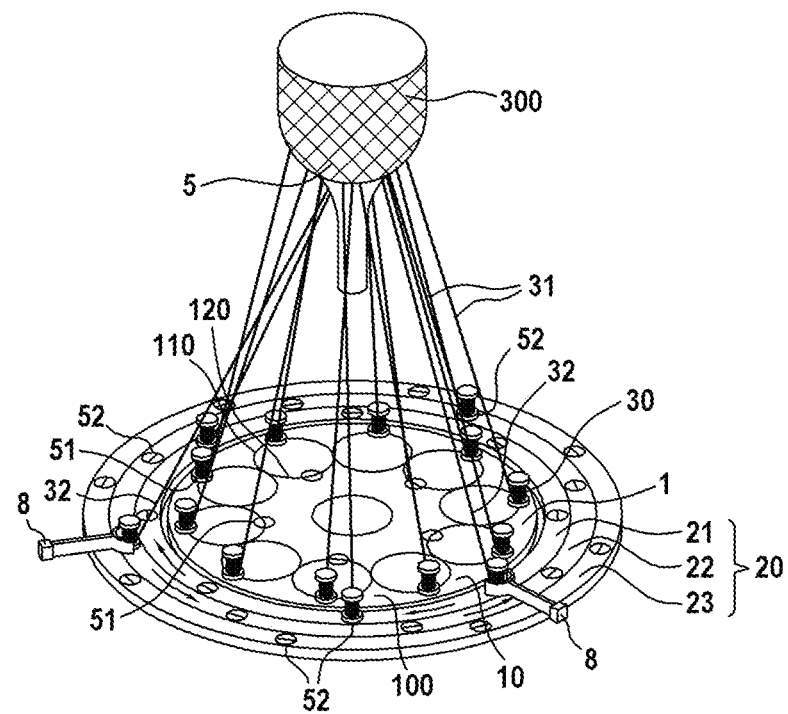

[Fig. 7]
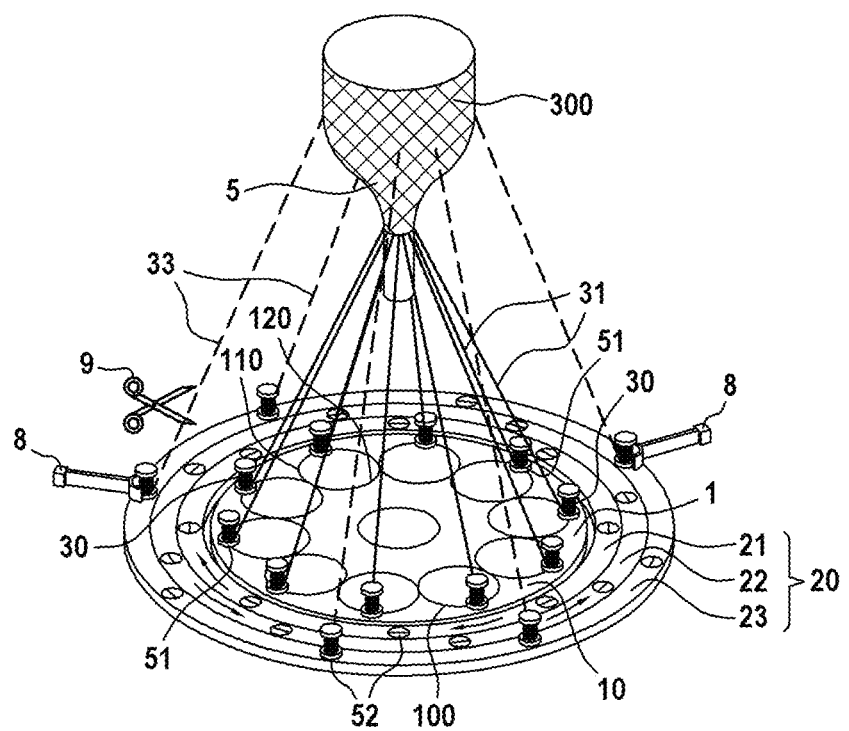

[Fig. 8]
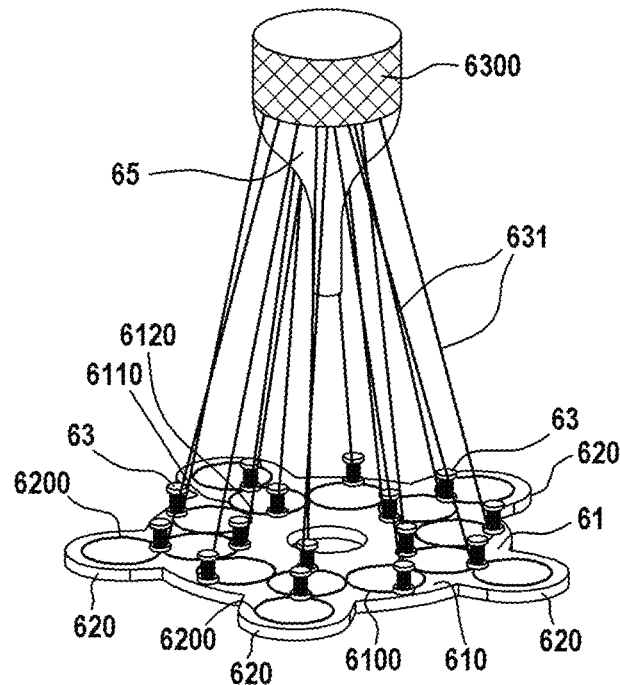
[Fig. 9]
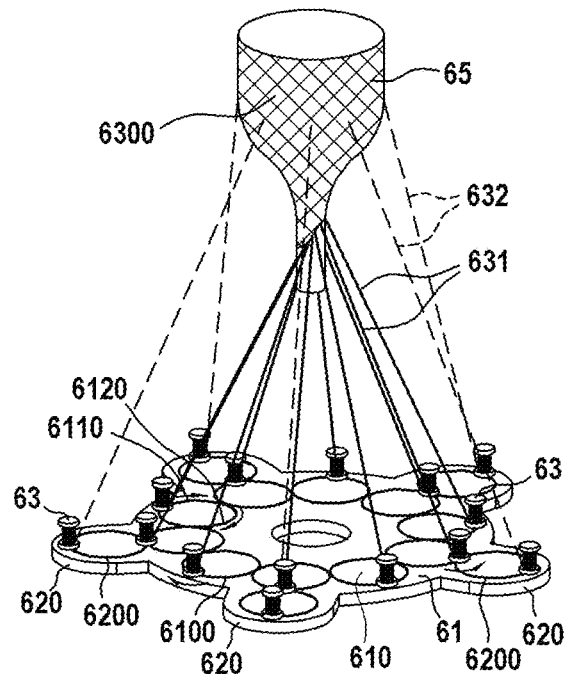

[Fig. 10]
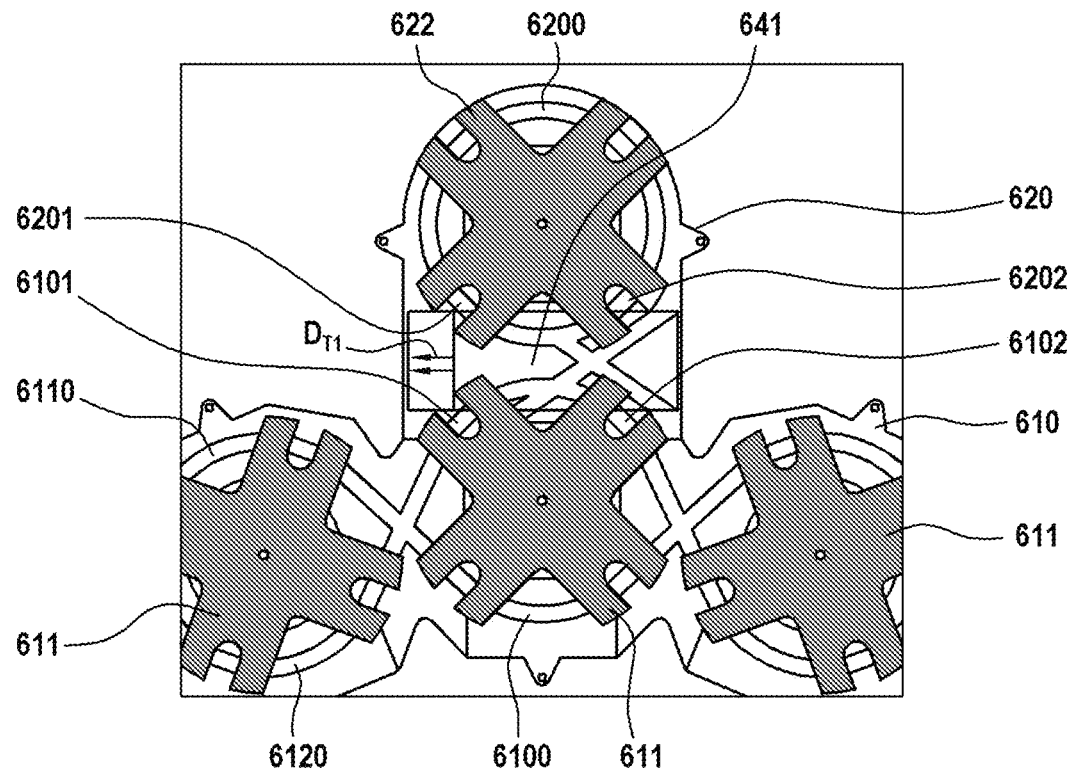
[Fig. 11]
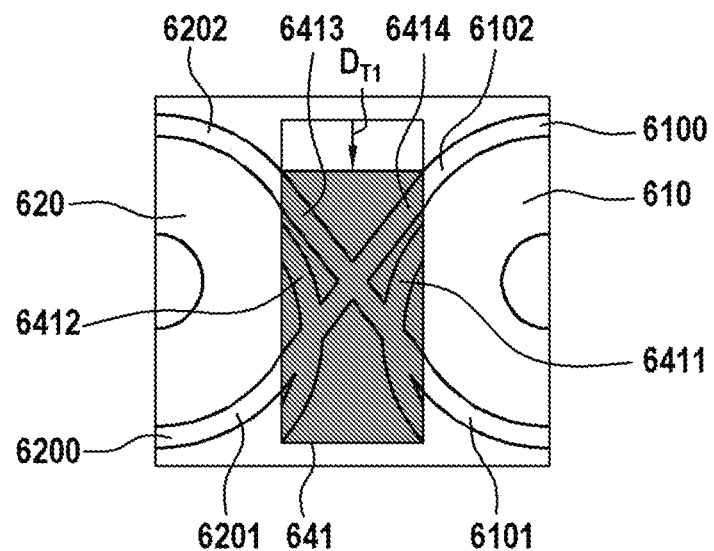

[Fig. 12]
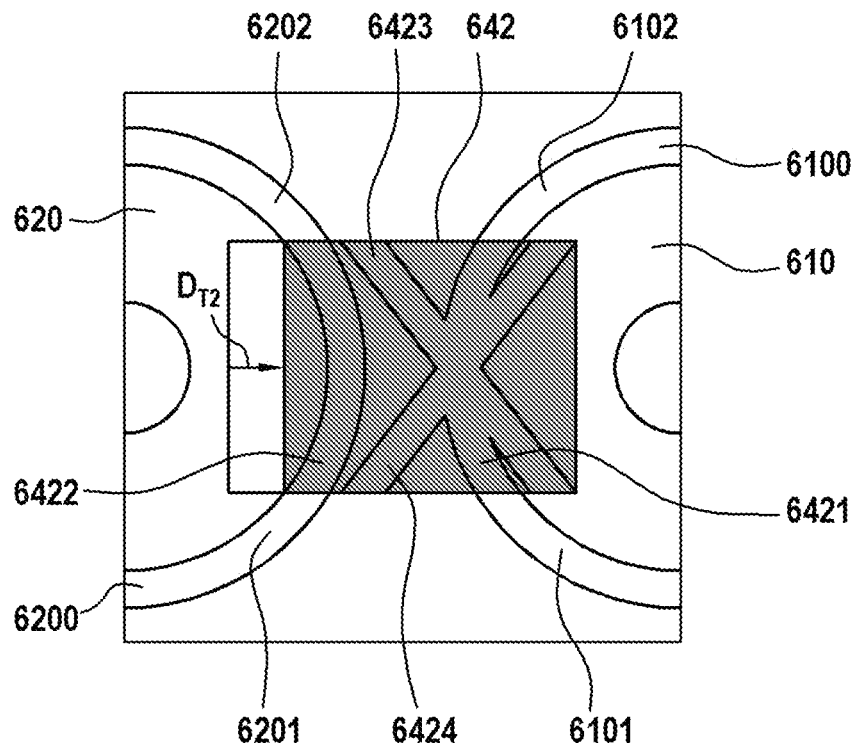
[Fig. 13A]
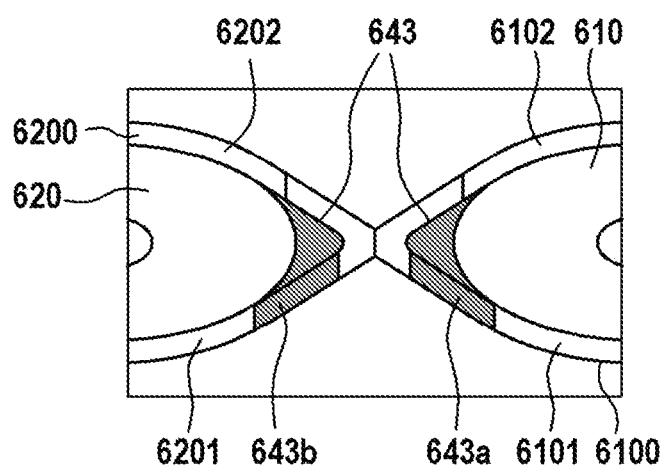

[Fig. 13B]
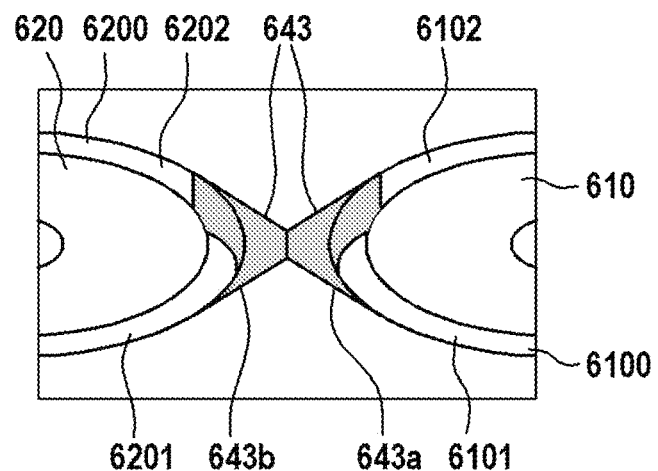
[Fig. 14]
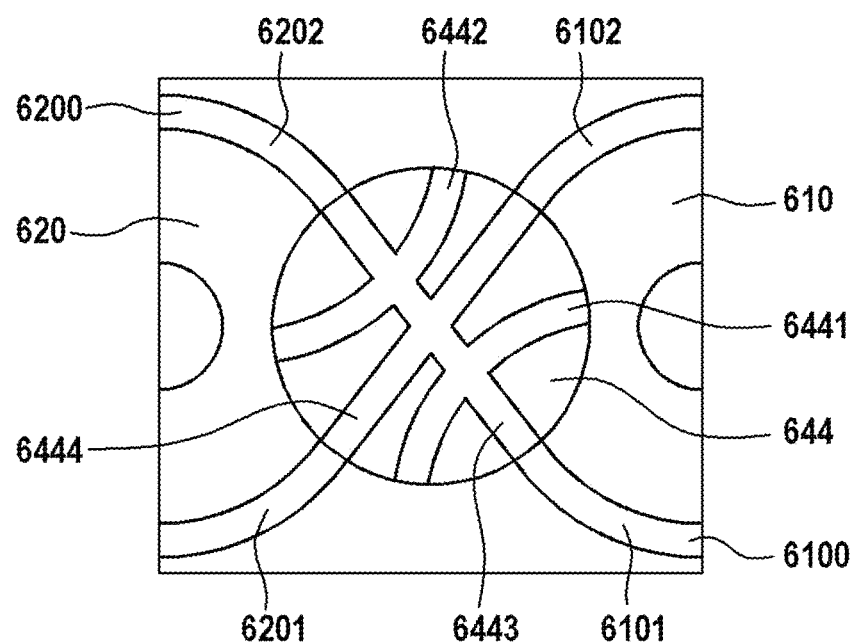

[Fig. 15]
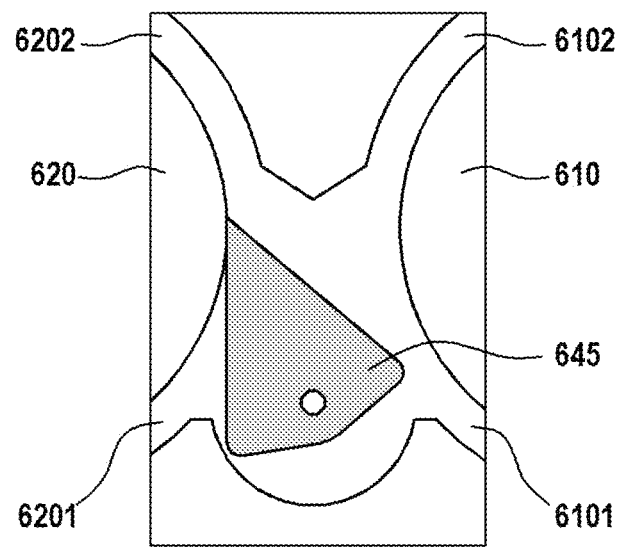
[Fig. 16]
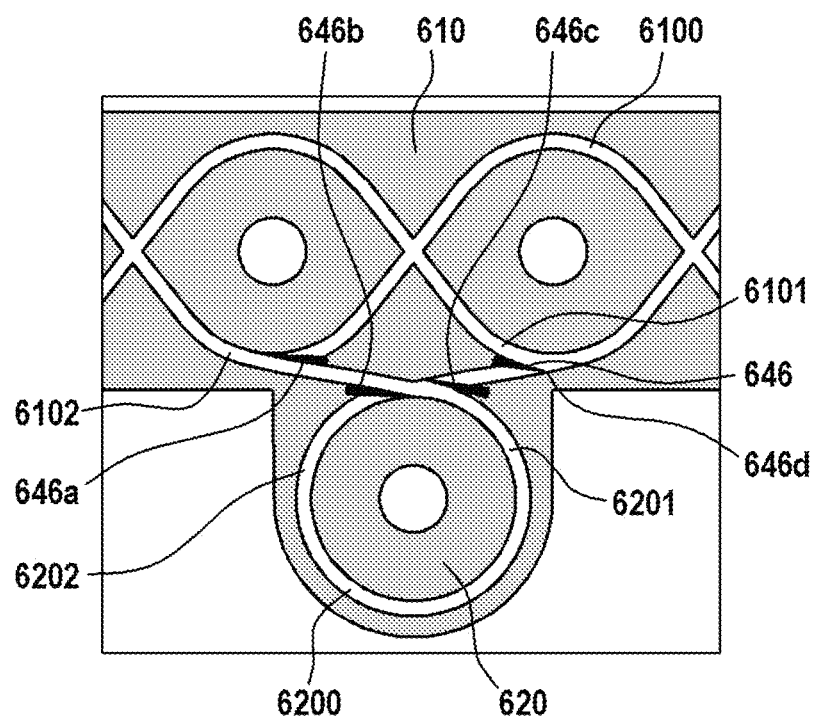

BRAIDING MACHINE WITH A RESERVE ZONE

CROSS-REFERENCE TO RELATED APPLICATIONS

This application is the U.S. National Stage of PCT/FR2023/050990, filed Jun. 28, 2023, which in turn claims priority to French patent application number 2206813 filed Jul. 5, 2022 and French patent application number 2206815 filed Jul. 5, 2022. The content of these applications are incorporated herein by reference in their entireties.

TECHNICAL FIELD

The present invention relates to braiding machines for producing braided structures, and more particularly tubular braided structures having large variations in cross-section.

PRIOR ART

A braiding machine conventionally comprises a plate having circuits, called guide paths, which intersect one another and along which feed spindles of yarn connected to a draw point of the machine are displaced. These yarn feed spindles then cross each other regularly in order to produce a braid. In general, the formation of the braid can be carried out on a former, called a shaping mandrel, which is displaced during the formation of said braid: this is then referred to as "over-braiding". The displacement of the spindles along the guide paths is conventionally carried out by means of notched wheels driven in rotation and preferably arranged in one or more concentric circles. Such braiding machines are described, for example, in documents FR 2 804 133 and U.S. Pat. No. 8,347,772.

When it is desired to manufacture a braided structure having large variations in cross-section with a machine of the prior art, it is observed that the resulting braided structure does not have uniform braiding. More specifically, in the zones of the braid having a large cross-section, the density of yarns is smaller or even insufficient, or the angles between the braided yarns are larger in comparison with the zones of the braid of smaller cross-section.

DISCLOSURE OF THE INVENTION

The aim of the present invention is to overcome the above mentioned disadvantages by proposing a braiding machine able to produce a uniform braided structure despite large variations in cross-section. For this purpose, according to a first aspect of the invention, the invention proposes a braiding machine comprising:
- a plurality of yarn feed spindles connected to guide supports and movable along a guide path so as to participate in the braiding, all or some of the spindles being integral with a positioning element cooperating with a corresponding guide support and removable from the latter,
- a plurality of reserve supports located outside the guide path, said reserve supports being able to receive yarn feed spindles placed in reserve so as to interrupt their participation in the braiding, the positioning elements being able to cooperate with the reserve supports in order to carry out this placing in reserve.

Thus, the use of spindles able to cooperate with guide supports that are movable along the guide path, enables easy removal or addition of spindles to the braiding, without the need for complex operations such as dismantling the braiding machine plate.

Such a system of cooperation between the positioning elements and the guide supports makes it possible to easily vary the number of yarn feed spindles participating in the braiding of the braided structure. Thus, the number of spindles participating in the braiding can be adapted to the cross-section of the structure to be braided in order to obtain constant yarn density and angle values between the yarns, despite the variations in cross-section.

Thus, when it is desired to reduce the cross-section of the braided structure, spindles are withdrawn from the guide path in order to interrupt their participation in the braiding, by separating the positioning elements of said spindles from the guide supports. Consequently, the number of braided yarns is reduced, which makes it possible to avoid a notable increase in the density of yarns, or else an undesired reduction in the angles between the braided yarns, in the zone with the lowest cross-section. By contrast, when it is desired to increase the cross-section of the braided structure, spindles are added on the main guide path, by mounting the positioning elements of said spindles with the guide supports present on the guide path. Consequently, the number of braided yarns is increased, which makes it possible to avoid a notable reduction in the density of yarns, or else an undesired reduction in the angles between the braided yarns, in the zone with the lowest cross-section. The braiding weave thus remains identical and uniform over the entire braided structure thus obtained.

The use of reserve supports makes it easy to store the spindles in a reserve zone, in particular the spindles having been withdrawn from the guide path in order to interrupt their participation in the braiding, and/or the spindles being intended to be added on the guide path in order to participate in the braiding.

According to a particular embodiment of the invention, the machine comprises a drive system for the reserve supports, able to drive at least some of the reserve support circumferentially to the guide path.

The reserve supports go around the outside edge of the guide path, or go around the inside edge of the guide path.

The use of a reserve zone comprising at least one movable part rotating circumferentially to the guide path can limit the appearance of singularities in the braiding. More specifically, when a spindle has just been removed from the guide path in order to interrupt the participation in the braiding of the yarn coming from said spindle, the yarn coming from said spindle is still being intertwined. When the yarn is being intertwined, it is neither braided and tightened with the other yarns, nor free. There is therefore a transition stage in which the yarn no longer participates in the braiding, but is still being intertwined, so that a part of the yarn is completely braided and tightened with the other yarns, a part of the yarn is in the process of being intertwined and a part of the yarn is free. This transition stage finishes when the part of the yarn which was in the process of being intertwined is completely braided and tightened with the other yarns, in other words when the yarn only comprises a completely braided and tightened part, and a free-part that is not braided and not intertwined.

If the spindle withdrawn from the guide path is positioned directly on a reserve support fixed relative to the movable guide supports, the yarn coming from said spindle is abruptly stopped while it may be in the process of being intertwined, which can lead to undesired tensions in the yarns or to singularities in the braiding. In order to accompany the yarn during the transition stage, in other words when it is still in the process of being intertwined but is no longer participating in the braiding, the spindle from which said yarn is coming can be positioned on a movable reserve support. Said movable reserve support can thus prolong the movement of the spindle in the clockwise and anticlockwise direction, at least until the end of the transition stage. When the transition stage is terminated, the movement of the movable reserve support can be interrupted, the spindle can be displaced over a fixed part of the reserve zone and/or the yarn coming from said spindle can be cut.

According to another particular embodiment of the invention, the drive system of the reserve supports comprises at least one first ring circumferential to the guide path that is able to turn in a first direction of rotation, and at least one second ring circumferential to the guide path that is able to turn in a second direction of rotation opposite to the first direction of rotation, each first or second ring carrying one or more reserve supports.

The first and second rings surround the outer edge of the guide path, or go around the inside edge of the guide path.

Thus, it is possible to simultaneously accompany, in their transition stage, yarns coming from spindles which turn in the clockwise direction on the guide path and yarns coming from spindles which turn in the anticlockwise direction.

According to another particular embodiment of the invention, the reserve supports are present around the guide path.

By placing the reserve zone, and any reserve circumferential rings, on the periphery of the guide path, access to the spindles present in the reserve zone is facilitated. According to another particular embodiment of the invention, the machine further comprises a shaping mandrel on which the braiding is intended to be carried out.

The presence of a shaping mandrel facilitates the braiding of the structure, the shape of the shaping mandrel providing a support on and around which the yarns can be braided with the desired cross-section.

According to another particular embodiment of the invention, the machine comprises a global drive system including the drive system of the reserve supports and a drive system of the guide supports, the global drive system being configured so that the angular velocity of at least some of the reserve supports is a function of the angular velocity of at least some of the guide supports in order that the movement of at least some of the reserve supports accompanies the movement of at least some of the guide supports.

According to another particular embodiment of the invention, the global drive system comprises a transmission system configured to transmit the movement of a drive system of the guide supports to the drive system of the reserve supports.

Preferably, the drive system of the reserve supports is a rack and pinion system. Preferably, the drive system of the guide supports is a system of notched wheels rotated by a gear train. Preferably, the transmission system is a belt system connecting the gear train of the drive system of the guide supports to the rack and pinion system of the drive system of the reserve supports. More specifically, this global drive system has the advantage of being robust and of enabling high braiding speeds.

According to another particular embodiment of the invention, the machine further comprises a robotic arm configured to displace at least one spindle between a guide support and a reserve support.

According to another particular embodiment of the invention, the machine further comprises a cutting device configured to cut a yarn coming from a feed spindle, the positioning element of which cooperates with a reserve support.

The invention also relates to a method for braiding a braided structure comprising a first zone having a first cross-section and a second zone having a second cross-section different from the first cross-section, the method using a machine according to the first aspect of the invention and comprising:
  the braiding of the first zone of the braided structure with a first number of yarn feed spindles movable along the guide path, and
  the braiding of the second zone of the braided structure with a second number of yarn feed spindles movable along the guide path, the second number of spindles being different from the first number of spindles through the displacement of spindles between the guide supports and the reserve supports by cooperation of the positioning element of said displaced spindles with the guide supports or reserve support.

The invention also proposes, according to a second aspect of the invention, a braiding machine comprising:
  a plurality of yarn feed spindles movable along of a main guide path so as to participate in the braiding,
characterised in that it further comprises:
  a reserve zone adjacent to the main guide path and comprising at least one secondary guide path able to receive at least one spindle and to retain it in the reserve zone so that its participation in the braiding is interrupted, each secondary guide path being associated with at least one switching element which is movable between a first position preventing the communication between the main guide path and the secondary guide path, and a second position allowing this communication and configured to enable passage of at least one spindle between the main guide path and the secondary guide path.

The reserve zone can be located on the outer-edge side of the main guide path, or on the inner-edge side of the main guide path. According to an example, the reserve zone can surround the outer edge of the main guide path, or go around its inside edge.

The presence of the reserve zone enables the number of yarn feed spindles participating in the braiding of the braided structure to be varied. Thus, the number of spindles participating in the braiding can be adapted to the cross-section of the structure to be braided in order to obtain constant yarn density and angle values between the yarns, despite the variations in cross-section.

Thus, when it is desired to reduce the cross-section of the braided structure, spindles are withdrawn from the main guide path in order to interrupt their participation in the braiding. Consequently, the number of braided yarns is reduced, which makes it possible to avoid a notable increase in the density of yarns, or else an undesired reduction in the angles between the braided yarns, in the zone with the lowest cross-section. By contrast, when it is desired to increase the cross-section of the braided structure, spindles present in the reserve zone are displaced in order to add them to the main guide path. Consequently, the number of braided yarns is increased, which makes it possible to avoid a notable decrease in the density of yarns, or else an undesired increase in the angles between the braided yarns, in the zone with the lowest cross-section. The braiding weave thus remains identical and uniform over the entire braided structure thus obtained.

According to a particular embodiment of the invention, the machine further comprises a shaping mandrel on which the braiding is intended to be carried out.

The presence of a shaping mandrel facilitates the braiding of the structure, the shape of the shaping mandrel providing a support on and around which the yarns can be braided with the desired cross-section.

According to another particular embodiment of the invention, the reserve zone is formed by a plurality of reserve regions distributed along the main guide path, each reserve region comprising a secondary guide path separated from the secondary guide paths of the other reserve regions.

According to another particular embodiment of the invention, the machine comprises a plurality of main notched wheels configured to be rotated in order to circulate the feed spindles along the main guide path, said machine further comprising one or more secondary notched wheels in the reserve zone, each secondary guide path of the reserve zone being associated with at least one secondary notched wheel configured to be rotated in order to circulate at least one feed spindle along said secondary guide path.

According to another particular embodiment of the invention, the machine comprises at least one decoupling system of the rotation, configured to make the rotation of at least one secondary notched wheel independent of the rotation of the main notched wheels.

According to another particular embodiment, at least some of the switching elements are movable in translation in order to pass from the first to the second position.

According to another particular embodiment of the invention, at least some of the switching elements are movable in rotation in order to pass from the first to the second position.

According to another particular embodiment of the invention, the machine further comprises a control unit configured to actuate the switching element.

According to another particular embodiment of the invention, the machine further comprises a cutting device configured to cut a yarn coming from a feed spindle present in the reserve zone.

The invention also relates to a method for braiding a braided structure comprising a first zone having a first cross-section and a second zone having a second cross-section different from the first cross-section, the method using a machine according to the second aspect of the invention and comprising:
- the braiding of the first zone of the braided structure with a first number of yarn feed spindles movable along the main guide path, and
- the braiding of the second zone of the braided structure with a second number of yarn feed spindles movable along the main guide path, the second number of spindles being different from the first number of spindles through passage of spindles between the main guide path and the reserve zone by actuation of the switching element.

BRIEF DESCRIPTION OF THE DRAWINGS

FIG. 1 is a three-dimensional view of a braiding machine according to the first aspect of the invention.

FIG. 2 is a detailed view from above of the braiding machine of FIG. 1.

FIG. 3 is an exploded schematic view of a spindle cooperating with a guide support.

FIG. 4 is a schematic view of the operating mechanisms of the braiding machine of FIGS. 1 and 2.

FIG. 5 is a schematic view of the machine of FIGS. 1 and 2 during the braiding of a large cross-section braid part.

FIG. 6 is a schematic view of the machine of FIGS. 1 and 2 during the braiding of a gradually changing cross-section braid part.

FIG. 7 is a schematic view of the machine of FIGS. 1 and 2 during the braiding of a small cross-section braid part.

FIG. 8 is a schematic view of a braiding machine according to the second aspect of the invention during the braiding of a large cross-section braid part.

FIG. 9 is a schematic view of the braiding machine of FIG. 8 during the braiding of a small cross-section braid part.

FIG. 10 is a schematic view of a portion of the plate of the braiding machine of FIGS. 8 and 9 comprising notched wheels.

FIG. 11 is a schematic view of a switching element movable in translation in its second position according to a first embodiment.

FIG. 12 is a schematic view of a switching element movable in translation in its first position according to a second embodiment.

FIG. 13A is a schematic view of a switching element movable in translation in its second position according to a third embodiment.

FIG. 13B is a schematic view of the switching element of FIG. 13A in its first position.

FIG. 14 is a schematic view of a switching element movable in rotation according to a fourth embodiment.

FIG. 15 is a schematic view of a switching element movable in rotation according to a fifth embodiment.

FIG. 16 is a schematic view of a switching element movable in rotation according to a sixth embodiment.

DESCRIPTION OF THE EMBODIMENTS

A first aspect of the invention is described in relation to FIGS. 1 to 7.

FIGS. 1 and 2 schematically illustrate and exemplary braiding machine according to the first aspect of the invention that can produce a braided structure.

The braiding machine comprises a plate 1 and a plurality of yarn feed spindles 30. The plate 1 is preferably horizontal, in order to facilitate its retention and that of the yarn feed spindles 30. However, it does not depart from the scope of the invention if the plate 1 is vertical or inclined.

The plate 1 comprises a braiding zone 10. The braiding zone 10 comprises a guide path 100 and a plurality of guide supports 51 able to cooperate with said guide path 100, and consequently able to be displaced along the guide path 100. Preferably, the guide path 100 is machined in the body of the plate 1 in the form of grooves, having for example a substantially rectangular cross-section, open to the outside, and inside which the guide supports 51 are displaced.

Each guide support 51 comprises a guide face 51a and a mounting face 51b opposite the guide face 51a. The guide face 51a is able to cooperate with the guide path 100. In particular, the guide face 51a of the guide support 51 comprises a protruding relief configured to be displaced inside the groove of the guide path 100. Preferably, all of the guide supports 51 present in the braiding zone 10 are identical.

Preferably, the braiding machine comprises a shaping mandrel 5, which is a former on which the intertwined yarns come to rest in order to form the tightened braid. In this case, the braiding machine enables so-called "over-braiding" methods to be carried out. The braiding machine according to the invention is particularly interesting in the case where it is desired to produce a braid having significant variations in cross-section and, more precisely, a braid for which the perimeter of the cross-section varies significantly. Unless otherwise stated, the cross-sections are considered perpendicular to a longitudinal axis of the braided structure. Consequently, the advantages provided by the braiding machine according to the invention are particularly notable when said braiding machine comprises a shaping mandrel 5, the shape of which has large variations in thickness.

The braiding machine further comprises at least one draw point located remotely from the plate 1, and to which the yarns coming from feed spindles 30 movable along the guide path 100 are connected.

The braiding machine also comprises a reserve zone 20 circumferential to the braiding zone 10, which comprises a plurality of reserve supports 52. In the example illustrated in FIGS. 1 and 2, the reserve zone 20 is present around the outer edge of the braiding zone 10, which makes it possible to easily access said reserve zone 20. However, it does not depart from the scope of the invention if the reserve zone 20 goes around the inside edge of the braiding zone 10. Preferably, the reserve zone 20 is located in the same plane as the braiding zone 10. Preferably, the reserve zone 20 is adjacent to the guide path 100.

Here, the reserve zone 20 is in the form of a plurality of circumferential and concentric rings 21, 22, 23. Each ring 21, 22, 23 comprises at least one reserve support 52. Each reserve support 52 comprises a mounting face 52*b*. Preferably, all the reserve supports 52 present in the reserve zone 20 are identical.

As illustrated in FIG. 3, each yarn feed spindle 30 comprises a retention portion 34 intended to receive a yarn reel, extended by a positioning element 35. The positioning element 35 is integral with the spindle 30. The positioning element 35 is configured to cooperate with the guide supports 51 and with the reserve supports 52. In particular, the positioning element 35 comprises a mounting face 35*b* opposite the retention portion 34, which is configured to cooperate with the mounting face 51*b* of the guide supports 51 and with the mounting face 52*b* of the reserve supports 52.

In particular, the mounting face 35*b* of the positioning element 35 can comprise a groove, and the mounting faces 51*b* and 52*b* of the guide supports 51 and reserve supports 52 can comprise a protruding relief, the groove of the mounting face 35*b* of the positioning element 35 being configured to cooperate with the protruding relief of the mounting faces 51*b* and 52*b* of the guide supports 51 and 52. The inverse is also possible.

Thus, each spindle 30 can be mounted on a guide support 51, by making the mounting face 35*b* of said spindle 30 cooperate with the mounting face 51*b* of said guide support 51, and can be mounted on a reserve support 52, by making the mounting face 35*b* of said spindle 30 cooperate with the mounting face 52*b* of said reserve support 52. Preferably, all the spindles 30 can be mounted on all the guide supports 51 and on all the reserve supports 52. Preferably, the mounting faces 51*b* of the guide supports 51 and the mounting faces 52*b* of the reserve supports 52 are identical.

The spindles 30 mounted on the guide supports 51 in the braiding zone 10 can participate in the braiding, in other words, the one or more yarns coming from the reels of said spindles 30 mounted on the guide supports 51 can be braided. Thus, the spindles 30 mounted on the guide supports 51 are movable along the guide path 100.

The guide path 100 is configured to be travelled in a first direction of rotation, for example in the clockwise direction, by a first plurality of spindles 30 and in a second direction of rotation, for example in the anticlockwise direction, by a second plurality of spindles 30 in order to carry out the braiding. Thus, a first plurality of guide supports 51 is configured to be movable at least in the clockwise direction and a second plurality of guide supports 51 is configured to be movable at least in the anticlockwise direction.

In the example illustrated in FIGS. 1 and 2, the guide path 100 comprises two sub-guide paths 110 and 120 which cross each other regularly, the first sub-guide path 110 being configured to be travelled by the first plurality of guide supports 51 on which the first plurality of spindles 30 is mounted, and the second sub-path 120 being configured to be travelled by the second plurality of guide supports 51 on which the second plurality of spindles 30 is mounted. Of course, it does not depart from the scope of the invention if the guide path comprises more than two sub-paths, for example if it was desired to produce a braided structure comprising a plurality of layers or having a complex binding weave, such as an interlock braiding for example.

The braiding machine according to the invention comprises, in well-known manner, a drive system of the guide supports 51. Preferably and in well-known manner, the braiding zone 10 of the plate 1 comprises a plurality of notched wheels 11 configured to be rotated in order to circulate the yarn feed spindles 30 along the guide path 100, as illustrated in FIGS. 1 and 2. Each notched wheel 11 preferably comprises four notches. The notched wheels 11 are preferably rotated, in well-known manner, by means of gear trains controlled by one or more motors, the gear trains being preferably located on the face of the plate 1 opposite the face including the guide path 100 and the notched wheels 11. For example, the reserve zone 20 does not comprise notched wheels, and the reserve supports 52 are not driven by notched wheels.

The braiding machine according to the invention preferably comprises a drive system of the reserve supports 52, able to drive at least some of the reserve supports 52 circumferentially to the guide path 100. In the example illustrated in FIGS. 1 to 4, the drive system for rotating the reserve supports 20 comprises at least one circumferential ring 21, 22 movable by rotation circumferential to the braiding zone 10, in other words movable in rotation along the inside or outside edge of the guide path 100. The reserve zone 20 preferably further comprises at least one stationary circumferential ring 23.

Preferably, the reserve zone 20 comprises at least one first circumferential ring 21 movable in a first direction of rotation, for example movable in the clockwise direction, and at least one second circumferential ring 22 movable in a second direction of rotation, opposite to the first direction of rotation, for example movable in the anticlockwise direction.

The one or more first circumferential rings 21 movable in the clockwise direction can accompany the movement of the first plurality of guide supports 51 movable on the guide path 100 in the clockwise direction, and consequently the movement of the first plurality of spindles 30 mounted on the first plurality of guide supports 51 and thus movable in the clockwise direction. Consequently, if it is desired to withdraw a spindle 30 movable in the clockwise direction from the braiding, in order to arrange it in the reserve zone 20, for example in order to produce a portion of the braided structure of smallest cross-section, but without risking that the yarn coming from said movable spindle 30 creates a singularity in the braiding or an undesired tension, it is possible to arrange said spindle 30 on the first ring 21 movable in the clockwise direction by making the positioning element 35 of said spindle 30 cooperate with a reserve support 52 present on the first ring 21. Thus, the yarn coming from said spindle 30 will remain movable in the clockwise direction in order to accompany the end of its braiding to the braided structure being produced, even if the spindle 30 has been withdrawn from the braiding zone and no longer participates in the braiding.

In a comparable manner, the one or more second circumferential rings 22 movable in the anticlockwise direction can accompany the movement of the second plurality of guide supports 51 movable on the guide path 100 in the anticlockwise direction, and consequently the movement of the second plurality of spindles 30 mounted on the second plurality of guide supports 51 and thus movable in the anticlockwise direction. Consequently, if it is desired to withdraw a spindle 30 movable in the anticlockwise direction from the braiding, in order to arrange it in the reserve zone 20, for example in order to produce a portion of the braided structure of smallest cross-section, but without risking that the yarn coming from said movable spindle 30 creates a singularity in the braiding or an undesired tension, it is possible to arrange said spindle 30 on the second ring 22 movable in the anticlockwise direction by making the positioning element 35 of said spindle 30 cooperate with a reserve support 52 present on the second ring 22. Thus, the yarn coming from said spindle 30 will remain movable in the anticlockwise direction in order to accompany the end of its braiding to the braided structure being produced, even if the spindle 30 has been withdrawn from the braiding zone and no longer participates in the braiding.

Thus, preferably, the circumferential movable rings 21 and 22 are preferably intended to temporarily receive the spindles 30 for a short period, before said spindles 30 are arranged on the one or more stationary rings 23 for a longer period. The movable circumferential rings 21 and 22 then correspond to a transition zone between the braiding zone 10 and the stationary parts of the reserve zone 20. Preferably, the arrangement of a spindle 30 on one of the movable rings 21, 22 is thus only temporary, for a period preferably corresponding to the period necessary for the yarn coming from said spindle, which is in the process of being intertwined with the other yarns at the time when said spindle is withdrawn from the braiding zone, to be fully braided into the braided structure to be produced. Thus the risk of singularities in the final braided structure is strongly reduced.

As illustrated in the example of FIG. 4, the machine according to the invention preferably comprises a global drive system which comprises, on the one hand, the drive system 71 for the guide supports 51 and, on the other hand, the drive system 73, 74, 76, 21, 22 for the reserve supports 52.

In the example illustrated in FIGS. 1 to 4, the rotation drive system of the movable rings 21 and 22, which belongs to the drive system of the reserve supports 52, can be mechanically linked to the rotation drive system of the notched wheels 11, which belongs to the drive system of the guide supports 51. For example, as illustrated in FIG. 4, the rotation drive system 71 of each notched wheel 11, preferably in the form of gears, is connected by a belt 72 to a pinion 73 belonging to the reserve zone 20. The movable rings 21, 22 each comprise a circumferential rack 74, 76 directly or indirectly actuated by the pinion 73. Thus, in the example illustrated in FIG. 4, the movement of the drive system 71 of the guide supports 51 is transmitted to the drive system 21, 22, 73, 74, 76 of the reserve supports 52 by means of a transmission system of the movement in the form of a belt 72.

Preferably, in order to further limit the risk of a singularity in the braiding following a change in the number of spindles 30 participating in the braiding, the global drive system is configured such that the angular velocity of at least some of the reserve supports 52 is a function of the angular velocity of at least some of the guide supports 51, in order that the movement of at least some of the reserve supports 52 accompanies the movement of at least some of the guide supports 51. Preferably, the angular velocity of at least some of the reserve supports 52 is equal to the angular velocity of at least some of the guide supports 51, in other words at least some of the reserve supports 52 travel the same angular extent relative to the central axis of the machine as at least some of the guide supports for a given period. The central axis of the machine can be defined, for example, as the axis passing through the draw point or through the centre of the shaping mandrel of the machine, and passing through the centre of the main guide path. The angular velocity is expressed in radians per second and the angular extent in radians, the centre of reference being a point on the central axis of the braiding machine.

Thus, at least some of the guide supports perform one complete turn along the guide path 100 when at least some of the guide supports 51 perform one complete turn of the guide path 100.

In the example illustrated in FIGS. 1 to 4, the movable rings 21, 22 perform one complete turn around the guide path 100 when at least some of the spindles 30 perform one complete turn of the guide path 100. Thus, the spindles 30 present on the first ring 21 movable in the clockwise direction follow the movement on the movable spindles 30 in the clockwise direction on the guide path 100, and the spindles 30 present on the second ring 22 movable in the anticlockwise direction follow the movement of the spindles 30 movable in the anticlockwise direction on the guide path 100. Consequently, the reduction ratio between the rotation of the notched wheels 11 and the rotation of each circumferential ring 21, 22 must preferably corresponds to half the value of the number of notched wheels 11 per circumferential row. In the example illustrated in FIG. 1, the braiding machine includes a single row of notched wheels 11 comprising sixteen notched wheels 11. Thus, the value of the reduction ratio between the rotation of each gear 71 of said notched wheels 11 and the rotation of the rack 74, 76 of each movable ring 21, 22 will be eight.

The transfer of the spindles 30 between the braiding zone 10 and the reserve zone 20, or between the different parts or circumferential rings 21, 22, 23 of the reserve zone 20, can be carried out manually or by one or more robotic arms 8 comprising a hooking and unhooking clamp. These robotic arms 8 are for example fixed around the braiding zone 10 and the reserve zone 20.

The braiding machine can also comprise a cutting system 9 configured to cut the yarns coming from spindles 30 arranged in the reserve zone 20, and in particular the yarns coming from spindles 30 arranged in the stationary parts of the reserve zone 20, in order to avoid any risk of tangling of one of the yarns not participating in the braiding with the yarns participating in the braiding.

In correlation with schematic FIGS. 5 to 7, an exemplary braiding method according to the first aspect of the invention will now be described, for producing a braided structure 300 having significant variations in cross-section, and more precisely significant variations in the perimeter of the cross-section. Thus, the braided structure 300 to be produced comprises, in its length, a first zone having a first cross-section perimeter, a transition zone, and a second zone having a second cross-section perimeter, the second perimeter being different from the first perimeter. In the example illustrated in FIGS. 5 to 7, the first perimeter is greater than second perimeter and the transition zone has a cross-section for which the perimeter decreases regularly between the first zone and the second zone.

In the example illustrated in FIGS. 5 to 7, the braiding is carried out on a shaping mandrel 5 which has the overall shape of the braided structure 300 to be produced. Of course, it does not depart from the scope of the invention if the braiding is not carried out on a shaping mandrel. The yarns coming from reels of the yarn feed spindles are fixed at a draw point.

The braiding starts by producing the first zone of the braided structure 300 causing a first number of yarn feed spindles 30 to circulate along the guide path 100, inside the braiding zone 10. Thus, the yarns 31 coming from reels carried by this first number of spindles 30 intertwine themselves around the shaping mandrel 5 so as to produce the first zone of the braided structure 300, as illustrated in FIG. 5.

In order to produce the transition zone of the braided structure 300, for which the cross-section perimeter decreases while maintaining a density of yarns and the angles between the yarns similar to the density of yarns and the angles between the yarns of the first zone of the braided structure 300, yarn feed spindles 30 are gradually removed from the braiding zone 10 in order to place them in the reserve zone 20. Thus, these feed spindles 30 are manually or automatically withdrawn from the guide path 100. Preferably, as illustrated in FIG. 6, a robotic arm 8 as previously described grasps a spindle 30 to be withdrawn from the guide path 100 and separates it from the guide support 51 on which it was mounted by separating the positioning element 35 of said spindle 30 from the mounting surface 51b of the guide support 51. Then, the robotic arm 8 displaces the spindle 30 to the reserve zone 20, in order to mount it on one of the reserve supports 52 present in the reserve zone 20 by assembling the positioning element 35 of said spindle 30 with the mounting face 52b of said reserve support 52.

In the example illustrated in FIG. 6, in order to produce the transition zone and then the second zone of the braided structure 300, the robotic arms 8 progressively withdraw some of the spindles 30 movable in the clockwise direction on the guide path 100 and some of the movable spindles 30 in the anticlockwise direction on the guide path 100. The spindles 30 movable in the clockwise direction which are withdrawn are then arranged on the reserve supports 52 of the first ring 21 movable in the clockwise direction, and the spindles 30 movable in the anticlockwise direction which are withdrawn are then arranged on the reserve supports 52 of the second ring 22 movable in the anticlockwise direction. When some of the spindles 30 are arranged on the movable rings 21 and 22, the yarns 32 coming from said spindles 30 arranged on the movable rings 21 and 22 no longer participate in the braiding but are in a transition stage, in other words they are still in the process of being intertwined with other yarns without yet being completely braided and tightened. The rotation of the movable rings 21, 22 makes it possible to accompany this transition stage of the yarns 32 coming from spindles 30 leaving the guide path 100 and the braiding zone 10.

When the yarn 32 coming from a spindle 30 arranged on a movable ring 21 or 22 has terminated the transition stage, in other words it is no longer in the process of being intertwined, the spindle 30 can be withdrawn from the movable ring 21 or 22 in order to be manually or automatically arranged on the circumferential stationary ring 23. Preferably, as illustrated in FIG. 7, the robotic arm 8 grasps a spindle 30 to be withdrawn from a movable ring 21 or 22 and separates it from the reserve support 52 on which it was mounted by separating the positioning element 35 of said spindle 30 from the mounting surface 52b of the reserve support 52. Then, the robotic arm 8 displaces the spindle 30 towards the stationary ring 23, in order to mount it with one of the reserve supports 52 present on said stationary ring 23 by assembling the positioning element 35 of said spindle 30 with the mounting face 52b of said reserve support 52 of the stationary ring 23. The yarns 33 coming from spindles arranged on the stationary ring 23 can be cut by the cutting device 9 in order to avoid any risk of tangling of one of the yarns 33 not participating in the braiding with the yarns 31 participating in the braiding.

When the braiding of the transition zone of the structure 300 is terminated, there remains only a second number of spindles 30 movable along the guide path 100, inside the braiding zone 10. In the example illustrated in FIGS. 5 to 7, the second number of movable spindles 30 is less than the first number of movable spindles 30 during the braiding of the first zone.

The second number of spindles 30 movable on the guide path 100 then makes it possible to braid the second zone of the braided structure 300, the yarns 31 coming from reels carried by this second number of spindles 30 intertwining around the shaping mandrel 5 as illustrated in FIG. 7 in order to produce the braided structure 300.

In an alternative that is not illustrated, a braided structure can be produced having, in its length, a first zone having a first cross-section perimeter, a transition zone and a second zone having a second cross-section perimeter, as in the example illustrated in FIGS. 5 to 7, but further comprising a second transition zone and a third zone having a third cross-section perimeter. The third perimeter of the third cross-section is here greater than second perimeter of the second cross-section, and can in addition be less than or greater than the first perimeter of the first cross-section. Of course, it does not depart from the scope of the invention if the third cross-section perimeter is less than the first and second cross-section perimeters.

In this alternative, the first zone, the transition zone and the second zone are produced as previously described. in order to produce the second transition zone of the braided structure, located in the extension of the second zone and for which the perimeter of the cross-section increases, while maintaining a density of yarns and the angles between the yarns similar to the density of yarns and the angles between the yarns of the first zone and the second zone already braided, yarn feed spindles present in the reserve zone are gradually transferred to the braiding zone in order to participate in the braiding.

Thus, these feed spindles are manually or automatically withdrawn from the stationary ring of the reserve zone. Preferably, a robotic arm as previously described grasps a spindle to be withdrawn from the stationary ring and separates it from the reserve support on which it was mounted by separating the positioning element of said spindle from the mounting surface of the reserve support. Then, the robotic arm displaces the spindle to one of the movable parts of the reserve zone, to mount it with one of the reserve supports present on the first or the second movable ring by assembling the positioning element of said spindle with the mounting face of said reserve support. In the alternative example, in order to produce the second transition zone and then the third zone of the braided structure, the robotic arms place some of the spindles present on the stationary ring on the ring movable in the clockwise direction, and some of the spindles present on the stationary ring on the ring movable in the anticlockwise direction.

When the yarns coming from spindles positioned on the movable rings accompany the movement of the yarns in the process of braiding, the one or more robotic arms progressively displace the spindles arranged on the ring movable in the clockwise direction on the one or more sub-guide paths travelled by the guide supports in the clockwise direction, and the spindles arranged on the ring movable in the anticlockwise direction on the one or more sub-guide paths travelled by the guide supports in the anticlockwise direction, by mounting the positioning element of said spindles with the mounting faces of said guide supports not bearing spindles. Thus, the yarns coming from spindles mounted on the guide supports participate in the braiding.

The prior passage of the yarn feed spindles on the movable parts of the reserve zone before their participation in the braiding, facilitates the introduction into the braiding of the yarns coming from said added spindles.

When the braiding of the second transition zone of the structure is terminated, there is thus a third number of spindles, greater than the second number of spindles, movable along the guide path, inside the braiding zone.

The third number of spindles movable on the guide path can then braid the third zone of the braided structure, the yarns coming from reels carried by this third number of spindles intertwining around the shaping mandrel.

The term "yarn" used in the present application can designate a single yarn or a single fibre, but can also designate a strand or a braid.

In particular, the yarns can be carbon fibres, ceramic fibres, or a mixture of carbon fibres and ceramic fibres. The braided structure according to the method of the invention can be a fibrous structure, which can optionally be consolidated or densified by a matrix in order to form the fibrous reinforcement of a part made of composite material. The braided structure according to the method of the invention can thus form, for example, all or some of the fibrous reinforcement of a composite material part for the automotive, aeronautical or space industries. In particular, the braided structure obtained can form, for example, the fibrous reinforcement of a rocket engine divergent or nozzle.

The braided structure according to the method of the invention also enables the formation of straps or ropes.

A second aspect of the invention is described in conjunction with FIGS. 8 to 16.

FIGS. 8 and 9 schematically illustrate an exemplary braiding machine according to the second aspect of the invention that can produce a braided structure. The braiding machine comprises a plate 61 and a plurality of yarn feed spindles 63. The plate 61 is preferably horizontal, in order to facilitate its retention and that of the yarn feed spindles 63. However, it does not depart from the scope of the invention if the plate 61 is vertical or inclined.

The plate 61 comprises a braiding zone 610 and a reserve zone in the form a plurality of reserve regions 620 distributed along the outer edge of the braiding zone 610, and separate or not separate from one another. Of course, it does not depart from the scope of the invention if the reserve zone does not belong to the plate comprising the braiding zone.

Of course, it does not depart from the scope of the invention if the braiding machine does not include a single continuous reserve zone circumferential to the braiding zone. Neither does it depart from the scope of the invention if the circumferential reserve zone is rotatable about the braiding zone, for example in the case where the reserve zone is a continuous ring rotatable around the braiding zone.

The reserve zone, whether or not in the form of a plurality of disjoint regions, is preferably located on the outside of the braiding zone 610, in other words around the main guide path 6100, in order to facilitate its accessibility. However, it does not depart from the scope of the invention if the reserve zone, whether or not in the form of a plurality of disjoint regions, is located on the inside of the braiding zone 610.

The braiding zone 610 comprises a main guide path 6100. The yarn feed spindles 63 movable along this main guide path 6100 participate in the braiding of the braided structure. The main guide path 6100 is thus configured to be travelled in the clockwise direction by a first plurality of spindles 63, and in the anticlockwise direction by a second plurality of spindles 63. In the example illustrated in FIGS. 8 and 9, the main guide path 6100 comprises two sub-guide paths 6110 and 6120 which cross each other regularly, the first sub-guide path 6110 being configured to be travelled by the first plurality of spindles 63 and the second sub-path 6120 being configured to be travelled by the second plurality of spindles 63. Of course, it does not depart from the scope of the invention if the main guide path comprises more than two two sub-paths, for example if it was desired to produce a braided structure comprising a plurality of layers or having a complex binding weave, such as an interlock braiding, for example.

The reserve regions 620 each comprise a secondary guide path 6200. By contrast to the yarn feed spindles 63 present in the braiding zone 610, the yarn feed spindles 63 present in the secondary guide path 6200 of these reserve regions 620, or more generally of the reserve zone, do not participate in the braiding of the braided structure. Each secondary guide path 6200 is thus configured to retain one or more feed spindles in one of the reserve regions 620, in other words outside of the braiding zone 610 and of the main guide path 6100. Preferably, there is no direct communication between the various secondary guide paths.

Each yarn feed spindle 63 carries a braiding yarn reel and comprises a guide support able to be displaced along the main 6100 and secondary 6200 guide paths. In a well known manner, each braiding yarn reel is connected to a tension management and yarn return system.

The braiding machine further comprises at least one draw point located remotely from the plate 61 and to which the yarns coming from reels carried by the feed spindles 63 movable along the main guide path 6100 are connected.

Preferably, the braiding machine comprises a shaping mandrel 65, which is a former on which the intertwined yarns come to rest in order to form the tightened braid. In this case, the braiding machine enables so-called "overbraiding" methods to be carried out. The braiding machine according to the invention is particularly interesting in the case where it is desired to produce a braid having significant variations in cross-section and, more precisely, a braid for which the perimeter of the cross-section varies significantly. Consequently, the advantages provided by the braiding machine according to the invention are particularly notable when said braiding machine comprises a shaping mandrel 65, the shape of which has large variations in thickness.

Preferably, the main 6100 and secondary 6200 guide paths are machined in the body of the plate 61 in the form of grooves having, for example, a substantially rectangular cross-section, open towards the outside, and inside which the guide supports of the feed spindles 63 are displaced.

Preferably and in well-known manner, the braiding zone 610 of the plate 61 comprises a plurality of main notched wheels 611 configured to be rotated in order to circulate the yarn feed spindles 63 along the main guide path 6100, as illustrated in FIG. 10.

Preferably, each reserve region 620 of the plate 61 also comprises at least one secondary notched wheel 622 configured to be rotated in order to circulate one or more yarn feed spindles 63 in the secondary guide path 6200 of said reserve region 620, as illustrated in FIG. 10. Preferably, each reserve region 620 and each secondary guide path 6200 comprises a single secondary notched wheel 622. Preferably, each secondary notched wheel 622 is adjacent to a main notched wheel 611. When a spindle 63 is retained in the reserve zone 620, on a secondary guide path 6200, there is preferably no passage of the spindle 63 from one notched wheel 622 to another. Thus, preferably, the spindle can circulate along the secondary guide path 6200, but only over a region of limited angular extent.

As illustrated in FIG. 10, each main 611 or secondary 622 notched wheel preferably comprises four notches. The main 611 or secondary 622 notched wheels are preferably rotated in well-known manner by means of gear trains controlled by one or more motors.

Preferably, each secondary notched wheel 622 of the braiding machine is connected to a rotating decoupling system, configured to make the rotation of said secondary notched wheel 622 independent of the rotation of the adjacent main notched wheel 611.

Each secondary guide path of the reserve zone is connected to the braiding zone 610 by means of a switching element. This switching element is movable between a first position enabling the secondary guide path 6200 of said reserve zone 620 to be isolated from the main guide path 6100, and a second position enabling the secondary guide path 6200 of said reserve zone 620 to be connected to the main guide path 6100, in order to enable the passage of at least one feed spindle 63 between the main guide path 6100 and the secondary guide path 6200. Thus, two branches 6101 and 6102 of main guide path 6100 and two branches 6201 and 6202 of secondary guide path 6200 open on each switching element.

Several types of switching element are possible in the context of the present invention.

According to a first embodiment of the invention, the switching element is movable in translation, in accordance with the examples illustrated in FIGS. 10 to 12.

In the example illustrated in FIGS. 10 and 11, the switching element 641 is in the form of a flat solid body movable in translation in a translation direction $D_{T1}$ tangential to the junction between the reserve zone 620 and the braiding zone 610. The switching element 641 comprises grooves 6411, 6412, 6413 and 6414 of substantially rectangular cross-section, open towards the outside, and configured to enable the passage of a guide support for a feed spindle 63.

The switching element 641 comprises a first groove 6411, a second groove 6412, a third groove 6413 and a fourth groove 6414. As illustrated in FIGS. 10 and 11, the first groove 6411 and the second groove 6412 do not have a common intersection, so that when the switching element 641 is in its first position, the first groove 6411 belongs entirely to the main guide path 6100 and the second groove 6412 belongs entirely to the secondary guide path 6200. Thus, when the switching element 641 is in its first position, the first groove 6411 connects the two branches 6101 and 6102 of main guide path 6100 and the second groove 6412 connects the two branches 6201 and 6202 of secondary guide path 6200.

As illustrated in FIGS. 10 and 11, the third groove 6413 and the fourth groove 6414 of the switching element 641 cross, so that when the switching element 641 is in its second position, illustrated in FIG. 11, the third groove 6413 connects the first branch 6101 of main guide path 6100 to the second branch 6202 of secondary guide path 6200 and the fourth groove 6414 connects the second branch 6102 of main guide path 6100 to the first branch 6201 of secondary guide path 6200.

Preferably, the first and second grooves 6411 and 6412 have a curved trajectory, whereas the third and fourth grooves 6413 and 6414 have a rectilinear trajectory.

In the example illustrated in FIG. 12, the switching element 642 is in the form of a flat solid body movable in translation in a translation direction $D_{T2}$ perpendicular to the junction between the reserve zone 620 and the braiding zone 610. The switching element 642 comprises grooves 6421, 6422, 6423 and 6424 of substantially rectangular cross-section, open towards the outside, and configured to enable the passage of a guide support for a feed spindle 63.

The switching element 642 comprises a first groove 6421, a second groove 6422, a third groove 6423 and a fourth groove 6424. As illustrated in FIG. 12, the first groove 6421 and the second groove 6422 are isolated from one another and do not have a common intersection, so that when the switching element 642 is in its first position, illustrated in FIG. 12, the first groove 6421 belongs entirely to the main guide path 6100 and the second groove 6422 belongs entirely to the secondary guide path 6200. Thus, when the switching element 642 is in its first position, the first groove 6421 connects the two branches 6101 and 6102 of main guide path 6100 and the second groove 6422 connects the two branches 6201 and 6202 of secondary guide path 6200.

As illustrated in FIG. 12, the third groove 6423 and the fourth groove 6424 of the switching element 642 cross, so that when the switching element 642 is in its second position, the third groove 6423 connects the first branch 6101 of main guide path 6100 to the second branch 6202 of secondary guide path 6200 and the fourth groove 6424 connects the second branch 6102 of main guide path 6100 to the first branch 6201 of secondary guide path 6200.

Preferably, the first and second grooves 6421 and 6422 have a curved trajectory, whereas the third and fourth grooves 6423 and 6424 have a rectilinear trajectory.

In the example illustrated in FIGS. 13A and 13B, the switching element 643 is in the form of two flat solid bodies 643a, 643b movable in translation in a direction of translation perpendicular to the junction between the reserve zone 620 and the braiding zone 610, the first solid body 643a moving in translation an opposite direction to the second solid body 643b. Each solid body 643a, 643b of the switching element 643 has a rounded edge opposite a straight edge.

When the switching element 643 is in the first position, the straight edge of the first solid body 643a is in contact with the straight edge of the second solid body 643b, so that the rounded edge of the first solid body 643a defines a part of the main guide path 6100 by connecting the two branches 6101 and 6102 of main guide path 6100 and so that the rounded edge of the second solid body 643b defines a part of the secondary guide path 6200 by connecting the two branches 6201 and 6202 of secondary guide path 6200. When the switching element 643 is in the second position, the rounded edge of the first solid body 643a is in contact with one of the walls of the main guide path 6100 and the rounded edge of the second solid body 643b is in contact with one of the walls of the secondary guide path 6200, so that the gap generated between the straight edge of the first solid body 643a and the straight edge of the second solid body 643b enables the passage of a feed spindle 63 from the first branch 6101 of main guide path 6100 to the second branch 6202 of secondary guide path 6200, and from the second branch 6102 of main guide path 6100 to the first branch 6201 of secondary guide path 6200.

According to a second embodiment of the invention, the switching element is movable by rotation, in accordance with the examples illustrated in FIGS. 14 to 16.

In the example illustrated in FIG. 14, the switching element 644 is in the form of a circular flat solid body movable in rotation with respect to an axis of rotation perpendicular to the plate 61. The switching element 644 comprises grooves 6441, 6442, 6443 and 6444 of substantially rectangular cross-section, open towards the outside, and configured to enable the passage of a foot of a feed spindle 63.

The switching element 644 comprises a first groove 6441, a second groove 6442, a third groove 6443 and a fourth groove 6444. As illustrated in FIG. 14, the first groove 6441 and the second groove 6442 do not have a common intersection, so that when the switching element 644 is in its first position, the first groove 6441 belongs entirely to the main guide path 6100 and the second groove 6442 belongs entirely to the secondary guide path 6200. Thus, when the switching element 644 is in its first position, the first groove 6441 connects the two branches 6101 and 6102 of main guide path 6100 and the second groove 6442 connects the two branches 6201 and 6202 of secondary guide path 6200.

As illustrated in FIG. 14, the third groove 6443 and the fourth groove 6444 of the switching element 644 cross, so that when the switching element 644 is in its second position, illustrated in FIG. 14, the third groove 6443 connects the first branch 6101 of main guide path 6100 to the second branch 6202 of secondary guide path 6200, and the fourth groove 6444 connects the second branch 6102 of main guide path 6100 to the first branch 6201 of secondary guide path 6200.

Preferably, the first and second grooves 6441 and 6442 have a curved trajectory, whereas the third and fourth grooves 6443 and 6444 have a rectilinear trajectory.

In the example illustrated in FIG. 15, the switching element 645 is in the form of a flat solid body of overall triangular shape connected by a pivotal link to the plate 61 and movable in rotation with respect to an axis of rotation perpendicular to the plate 61. When the switching element 645 is in the first position, the tip of the flat solid body is positioned between the main guide path 6100 and the secondary guide path 6200, so that a first edge of the flat solid body defines a part of the main guide path 6100 by connecting the two branches 6101 and 6102 of main guide path 6100, and so that a second edge of the flat solid body, opposite the first edge of said solid body, defines a part of the secondary guide path 6200 connecting the two branches 6201 and 6202 of secondary guide path 6200. When the switching element 645 is in the second position, the tip of the flat solid body is positioned in contact with one of the walls of the main guide path 6100, or in contact with one of the walls of the secondary guide path 6200 as illustrated in FIG. 15. When the tip of the flat solid body is positioned in contact with one of the walls of the main guide path 6100, the gap cleared between said flat solid body and the secondary guide path 6200 enables the passage of a feed spindle 63 between the first branch 6201 of the secondary guide path 6200 and the second branch 6102 of the main guide path 6100. When the tip of the flat solid body is positioned in contact with one of the walls of the secondary guide path 6200, as illustrated in FIG. 15, the gap cleared between said flat solid body and the main guide path 6100 enables the passage of a feed spindle 63 between the second branch 6202 of the secondary guide path 6200 and the first branch 6101 of the main guide path 6100.

In the example illustrated in FIG. 16, the switching element 646 is in the form of four flat solid bodies 646a, 646b, 646c, 646d of overall triangular shape and movable in rotation about an axis of rotation perpendicular to the plate 61. The first solid body 646a is present on the second branch 6102 of the main guide path 6100. The second solid body 646b is present on the second branch 6202 of the secondary guide path 6200. The third solid body 646c is present on the first branch 6201 of the secondary guide path 6200. The fourth solid body 646d is present on the first branch 6101 of the main guide path 6100.

Thus, when the switching element 646 is in the first position, the first solid body 646a and the fourth solid body 646d each define a wall of the main guide path 6100 by blocking the passage to the secondary guide path 6200. When the switching element 646 is in the second position, according to a first mode, the first solid body 646a pivots in order to connect the second branch 6102 of the main guide path 6100 to the first branch 6201 of the secondary guide path 6200, the second solid body 646b and the third solid body 646c being positioned so as to allow this connection, as illustrated in FIG. 16. According to a second mode, the fourth solid body 646d pivots to connect the first branch 6101 of the main guide path 6100 to the second branch 6202 of the secondary guide path 6200, the second solid body 646b and the third solid body 646c being positioned so as to allow this connection.

In each of the preceding examples, the switching element can be controlled manually, for example by means of a lever, or automatically, for example by means of a control unit configured to actuate said switching element.

The one or more switching elements can be connected to the gearing system enabling the movement of the feed spindles 63, for example to the gear train driving the rotation of the notched wheels 611 or 622. The use of a rotatable switching element is particularly interesting in this case, this configuration enabling a simplified mechanism for actuating the switching element and easy incorporation under the plate 61 of the braiding machine.

In correlation with FIGS. 8 and 9, an exemplary braiding method according to the second aspect of the invention will now be described, for producing a braided structure 6300 having significant variations in cross-section, and more precisely significant variations in the perimeter of the cross-section. Thus, the braided structure 6300 to be produced comprises, in its length, a first zone having a first cross-section perimeter, a transition zone, and a second zone having a second cross-section perimeter, the second perimeter being different from the first perimeter. Unless otherwise stated, the cross-sections are considered perpendicular to a longitudinal axis of the braided structure. In the example illustrated in FIGS. 8 and 9, the first perimeter is greater than second perimeter and the transition zone has a cross-section, the perimeter of which decreases regularly between the first zone and the second zone.

In the example illustrated in FIGS. 8 and 9, the braiding is carried out on the shaping mandrel 65 which has the overall shape of the braided structure 6300 to be produced.

Of course, it does not depart from the scope of the invention if the braiding is not carried out on a shaping mandrel. The yarns coming from reels of the yarn feed spindles 63 are fixed at a draw point.

The braiding starts by producing the first zone of the braided structure 6300 causing a first number of yarn feed spindles 63 to circulate along the main guide path 6100, inside the braiding zone 610. Thus, the yarns 631 coming from reels carried by this first number of spindles 63 intertwine themselves around the shaping mandrel 65 so as to produce the first zone of the braided structure 6300, as illustrated in FIG. 8.

In order to produce the transition zone of the braided structure 6300, for which the cross-section perimeter decreases while maintaining a density of yarns and the angles between the yarns similar to the density of yarns and the angles between the yarns of the first zone of the braided structure 6300, yarn feed spindles 63 are gradually removed from the braiding zone 610 in order to place them in the reserve zone 620. Thus, these feed spindles 63 leave the main guide path 6100 by means of a switching element to be retained in a secondary guide path 6200, in order to no longer participate in the braiding of the structure 6300. Consequently, the yarns 632 coming from reels carried by the spindles 63 retained in the reserve zone 620 are no longer braided.

These yarns 632 can be cut by a cutting device (not shown) configured to cut the yarn 632 coming from a feed spindle 63 present in the reserve zone 620 while the braiding operation continues, in order to avoid any risk of tangling of one of the yarns 632 not participating in the braiding with the yarns 631 participating in the braiding.

When the braiding of the transition zone of the structure 6300 is terminated, there remains only a second number of yarn feed spindles 63 movable along the guide path 6100, inside the braiding zone 610. In the example illustrated in FIGS. 8 and 9, the second number of movable feed spindles 63 is less than the first number of movable spindles 63 during the braiding of the first zone.

The second number of yarn feed spindles 63 movable on the main guide path 6100 then makes it possible to braid the second zone of the braided structure 6300, the yarns 631 coming from reels carried by this second number of spindles 63 intertwining around the shaping mandrel 65 as illustrated in FIG. 9.

In an alternative that is not illustrated, a braided structure can be produced having, in its length, a first zone having a first cross-section perimeter, a transition zone and a second zone having a second cross-section perimeter, as in the example illustrated in FIGS. 8 and 9, but further comprising a second transition zone and a third zone having a third cross-section perimeter. The third perimeter of the third cross-section is here greater than second perimeter of the second cross-section, and can in addition be less than or greater than the first perimeter of the first cross-section. Of course, it does not depart from the scope of the invention if the third cross-section perimeter is less than the first and second cross-section perimeters.

In this alternative, the first zone, the transition zone and the second zone are produced as previously described. in order to produce the second transition zone of the braided structure, located in the extension of the second zone and for which the perimeter of the cross-section increases, while maintaining a density of yarns and the angles between the yarns similar to the density of yarns and the angles between the yarns of the first zone and the second zone already braided, yarn feed spindles present in the reserve zone are gradually transferred to the braiding zone in order to participate in the braiding. Thus, by means of a switching element, these feed spindles leave the secondary guide path in which they are retained so as to be introduced onto the main guide path, in order to participate in the braiding of the structure. Consequently, the yarns coming from reels carried by the spindles added on the main guide path are braided with the yarns coming from reels carried by the second number of spindles already present on the main guide path.

When the braiding of the second transition zone of the structure is terminated, a third number of yarn feed spindles are movable along the main guide path, inside the braiding zone. The third number of yarn feed spindles movable on the main guide path 6100 can then braid the third zone of the braided structure, the yarns coming from reels carried by this third number of spindles intertwining around the shaping mandrel.

The term "yarn" used in the present application can designate a single yarn or a single fibre, but can also designate a strand or a braid.

In particular, the yarns can be carbon fibres, ceramic fibres, or a mixture of carbon fibres and ceramic fibres. The braided structure according to the method of the invention can be a fibrous structure, which can optionally be consolidated or densified by a matrix in order to form the fibrous reinforcement of a part made of composite material. The braided structure according to the method of the invention can thus form, for example, all or some of the fibrous reinforcement of a composite material part for the automotive, aeronautical or space industries. In particular, the braided structure obtained can form, for example, the fibrous reinforcement of a rocket engine divergent or nozzle.

The braided structure according to the method of the invention also enables the formation of straps or ropes.

The invention claimed is:

1. A braiding machine comprising:
a plurality of yarn feed spindles movable along of a main guide path so as to participate in the braiding,
a reserve zone adjacent to the main guide path, situated around the main guide path and comprising at least one secondary guide path able to receive at least one yarn feed spindle and to retain it in the reserve zone so that its participation in the braiding is interrupted, each secondary guide path being associated with at least one switching element which is movable between a first position preventing the communication between the main guide path and the secondary guide path, and a second position allowing this communication and configured to enable passage of at least one yarn feed spindle between the main guide path and the secondary guide path, and
a cutting device configured to cut a yarn coming from a yarn feed spindle present in the reserve zone while the braiding operation continues.

2. The machine according to claim 1, further comprising a shaping mandrel on which the braiding is intended to be carried out.

3. The machine according to claim 1, wherein the reserve zone is formed by a plurality of reserve regions distributed along the main guide path, each reserve region comprising a secondary guide path separated from the secondary guide paths of the other reserve regions.

4. The machine according to claim 1, said machine comprising a plurality of main notched wheels configured to be rotated in order to circulate the yarn feed spindles along the main guide path, said machine further comprising one or more secondary notched wheels in the reserve zone, each secondary guide path of the reserve zone being associated with at least one secondary notched wheel configured to be rotated in order to circulate at least one yarn feed spindle along said secondary guide path.

5. The machine according to claim 4, said machine comprising at least one decoupling system of the rotation, configured to make the rotation of at least one secondary notched wheel independent of the rotation of the main notched wheels.

6. The machine according to claim 1, wherein at least some of the switching elements are movable in translation in order to pass from the first to the second position.

7. The machine according to claim 1, wherein at least some of the switching elements are movable in rotation in order to pass from the first to the second position.

8. The machine according to claim 1, said machine further comprising a control unit configured to actuate the at least one switching element.

9. A method for braiding a braided structure comprising a first zone having a first cross-section and a second zone having a second cross-section different from the first cross-section, the method using a machine according to claims 1 and comprising:

braiding of the first zone of the braided structure with a first number of yarn feed spindles movable along the main guide path, and braiding of the second zone of the braided structure with a second number of yarn feed spindles movable along the main guide path, the second number of yarn feed spindles being different from the first number of yarn feed spindles through the passage of yarn feed spindles between the main guide path and the reserve zone by actuation of the at least one switching element.

* * * * *